United States Patent
Auborn et al.

Patent Number: 5,517,590
Date of Patent: May 14, 1996

[54] BENDING PROCESS FOR OPTICAL COUPLING OF GLASS OPTICAL FIBERS

[75] Inventors: James J. Auborn, Warren; Yvonne L. Barberio, Neshanic; Arthur E. Neeves, Morristown; Jay R. Simpson, Fanwood, all of N.J.

[73] Assignee: AT&T IPM Corp., Coral Gables, Fla.

[21] Appl. No.: 251,452

[22] Filed: May 31, 1994

[51] Int. Cl.$^6$ .................................................. G02B 6/26
[52] U.S. Cl. ............................................. 385/32; 385/51
[58] Field of Search ............................. 385/31, 32, 39, 385/45, 48, 51

[56] References Cited

U.S. PATENT DOCUMENTS

| | | | |
|---|---|---|---|
| 4,802,723 | 2/1989 | Miller | 385/32 |
| 4,889,403 | 12/1989 | Zucker et al. | 385/32 |
| 4,989,939 | 2/1991 | Cox et al. | 385/32 |
| 5,039,188 | 8/1991 | Williams | 385/32 |
| 5,040,866 | 8/1991 | Engel | 385/32 |
| 5,138,676 | 8/1992 | Stowe et al. | 385/32 |

*Primary Examiner*—John D. Lee
*Attorney, Agent, or Firm*—Martin I. Finston

[57] ABSTRACT

Signal energy in an installed optical fiber is extracted without using a physical connector, by an improved process in which the fiber is bent to within a prescribed range of angles, then controllably heated, and thereafter controllably cooled. The resulting structure exhibits relatively low permanent stress. A fiber end conventionally placed at the bend point receives unusually useful amounts of optical signal which can be routed to optical branch circuits in, for example, a building or a LAN.

6 Claims, 6 Drawing Sheets

BENDING PROCESS FOR OPTICAL COUPLING OF GLASS OPTICAL FIBERS

GOVERNMENT CONTRACT

This invention was made with Government support. The Government has certain rights in this invention.

FIELD OF THE INVENTION

This invention relates to optical fiber couplers; and particularly to optical fiber couplers used in distribution systems servicing buildings or local areas. It is especially applicable to active systems in which the coupling is effected without having to open the optical circuit.

BACKGROUND OF THE INVENTION

Optical fiber couplers in office and area distribution systems typically are made by breaking the fiber and fusing or otherwise bonding the cleaved ends to a pre-made coupler. An alternative coupling method is to extract signal energy through the fiber's cladding while the fiber is active or inactive. In this approach, the signal-containing fiber is bent, thereby allowing a traction of the signal energy to escape through the cladding; and that energy is collected by a detector. An example of this method is described in the patent of Beals, et al, U.S. Pat. No. 4,557,550, issued Dec. 10, 1985.

Many commercial fiber distribution networks are subject to high change and rearrangement rates. In these networks, if the fiber splicing regime requires the severing of one or more fibers for each new coupler, an eventual cumulative transmission degradation is introduced, which in commercial distribution networks is highly disadvantageous. As the optical fiber network is extended more and more widely into commercial offices, therefore, the spliced-in coupler method of extending the optical fiber network is increasingly unattractive.

The fiber coupling techniques which involve bending the fiber offer an inherently more attractive way to wire and grow a commercial optical fiber installation, because of the relatively lower risk of contamination and cumulative degradation. The prior art bending techniques, however, almost invariably subject the fiber to a high stress which itself introduces degradation and thus defeats the advantages of the technique.

OBJECTS OF THE INVENTION

Accordingly, one object of the invention is to improve the coupling efficiency of optical fiber couplers used in telephone distribution end-user and local area network environments.

Another object of the invention is to provide a means for coupling to an active optical fiber system without causing any signal interruption.

Another object of the invention is to provide an optical fiber coupler, the installation of which does not require subjecting the signal-containing fiber to high stress levels.

A specific object of the invention is to provide an optical fiber coupler and techniques for using the coupler, which results in faster and yet less trouble-prone additions to or rearrangement of an optical fiber distribution network.

SUMMARY OF THE INVENTION

The present invention is a method of extracting signal energy from a signal-containing optical fiber in which the fiber is first bent an angular amount within a range of relatively small angles, for example, from 10 to 40 degrees. The stresses in the fiber are then relaxed by a controlled localized heating of the fiber, wherein the temperature and the width of the heated zone are maintained at defined values. A branch optical fiber circuit with a light detector, such as an optical fiber end, is brought into close proximity of the bend point of the main fiber surface from which the light energy is escaping from the fiber core.

Advantageously, the light energy transmitted in the signal fiber beyond the bend point is maintained during the bending process. The dB loss in the main fiber resulting from the extraction of signal energy at the bend point stays within a predetermined controlled amount.

With the signal loss in the main path controlled to some desired minimum value, the heat is removed and the fiber assumes a permanent, low stress bend on cooling. The branch optical fiber may be affixed in its optimum determined physical position in relation to the main fiber, by various conventional means such as epoxy gluing or mechanical fixtures.

With experimentation, the inter-relationship between the bend angle of the main fiber, the positioning of the detector or branch fiber adjacent to the escaping signal, and the heating time and application zone can be predetermined. As a result, for optical fiber couplers of a common type in a commercial network, experience data can set the fabrication parameters; and it is not necessary to perform the monitoring steps. A customized, inexpensive and quick-to-install coupler thereby is achieved.

The invention and its further object features and advantages will be more fully appreciated from a reading of the detailed description to follow of an illustrative embodiment.

DESCRIPTION OF THE DRAWING

FIG. 2A is a detail of FIG. 2.

DETAILED DESCRIPTION OF AN ILLUSTRATIVE EMBODIMENT

Figure 1:
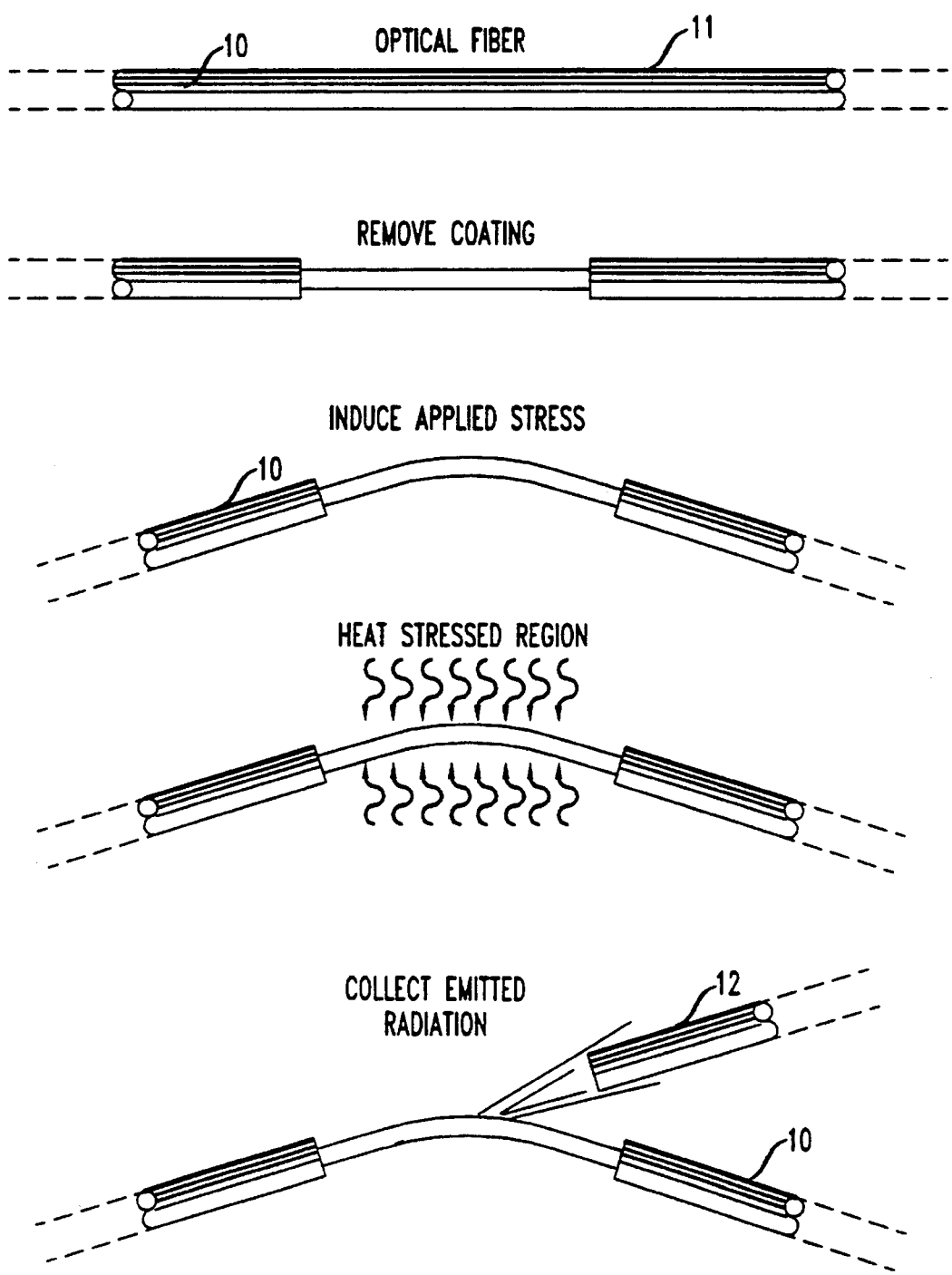
FIG. 1 is a sketch showing the stages of generating an optical fiber coupling.

The basic steps of the process are illustrated in FIG. 1. A feeder optical fiber 10 is identified as a fiber from which signal is to be extracted. It is useful, although not necessary, to know the physical properties of the fiber such as fiber core cladding diameter, fiber coat diameter and operating wavelength. The coating 11 is removed from the feeder fiber 10 for a distance of about 1 cm. A bend preferably confined to a common plane is then placed in feeder fiber 10. The bend naturally induces stress in the fiber 10, which will act as the driving force when the fiber is heated. This is a temporary stress which will be removed by subsequent steps, since any permanent stresses are undesirable.

A predetermined region of the bend in which the stresses occur is heated to a carefully controlled temperature, which relaxes the stresses. Under the controlled conditions, the fiber stresses relax and the fiber assumes a relatively sharp "microbend", which is defined as a bend that emits a portion of its optical signal in a controlled manner.

Specifically, the microbend is characterized by a preselected radius, and by an angle that represents a desired local change of direction of the feeder fiber.

The feeder fiber next is allowed to cool, to permanently establish the desired microbend.

A branch fiber 12 is then positioned at the site of the microbend to achieve a peak collection efficiency. The positioning of the end of the branch fiber 12 may be achieved actively, in a process in which the signal strength captured by the branch fiber is optimized by monitoring devices (not shown) and the bend branch area then is fixed in position. Alternatively, using knowledge of the feeder fiber physical characteristics, non-active alignment is possible.

Figure 8:
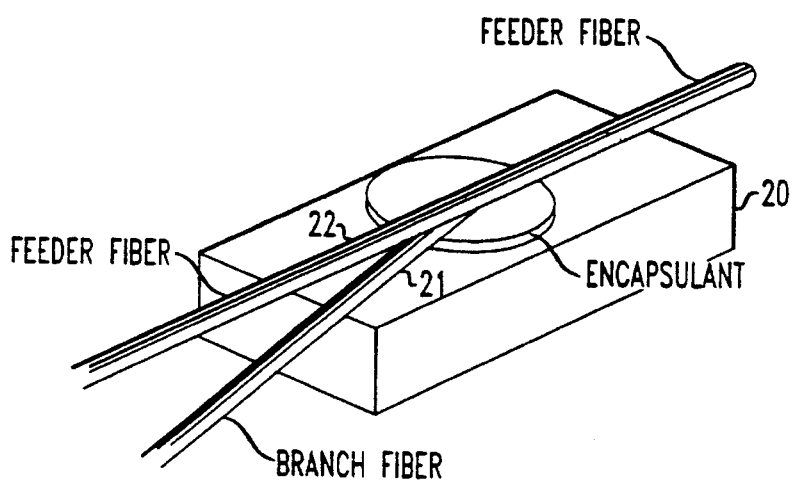
FIG. 8 is a sketch of a fiber v-groove fixture.

A coupler substrate of the type illustrated in FIG. 8 may be provided with appropriate v-grooves to contain both coated and stripped parts of the feeder and branch fibers. The substrate accommodates the microbend of the feeder fiber and optically positions the end of the branch fiber 12 in relation to the microbend. Appropriate adhesive applications then fix the coupler components in position.

ESTABLISHING THE MICROBEND

Figure 2:
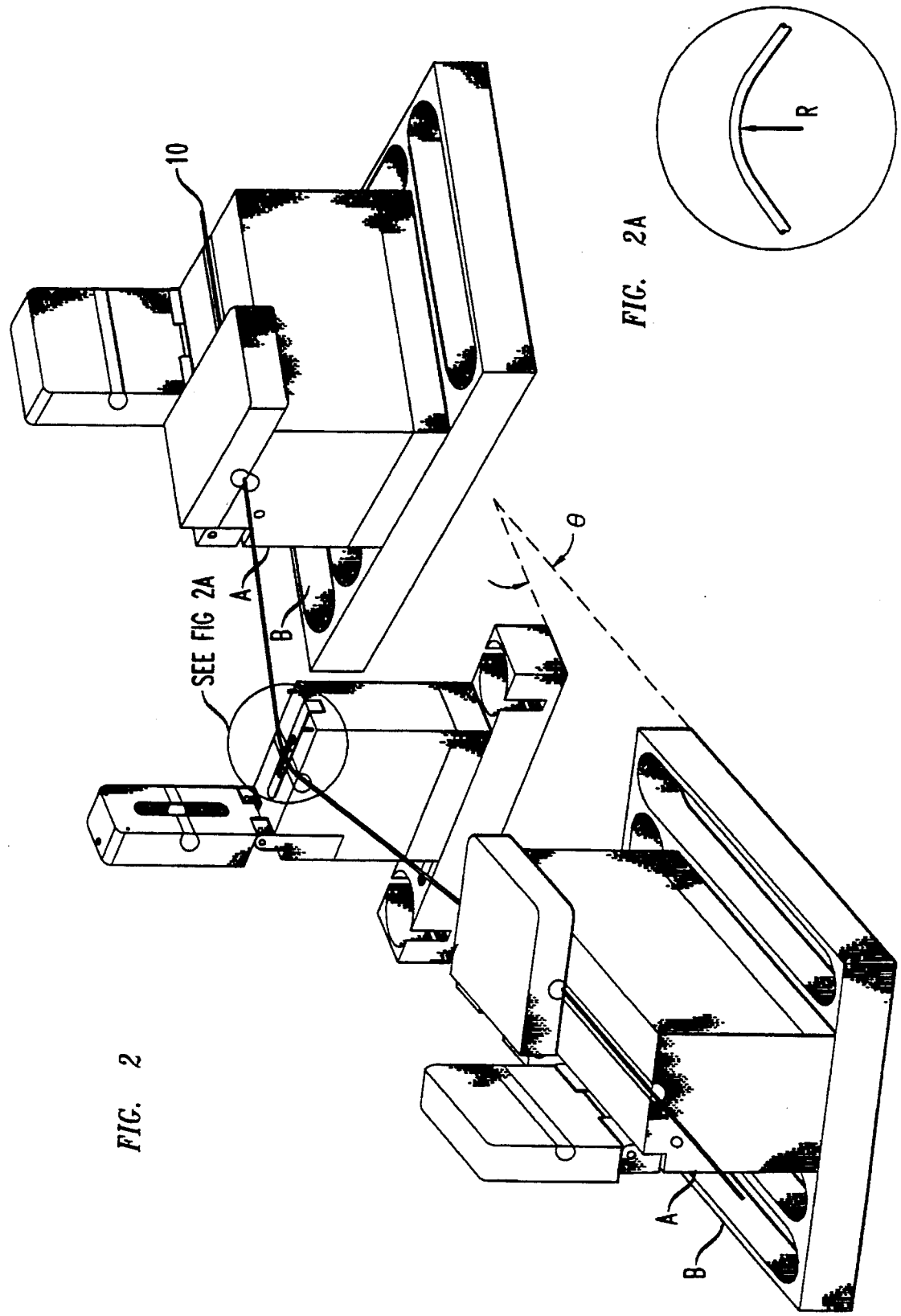
FIG. 2 is a sketch of a fixture useful in practicing the invention.

While many mechanisms for creating the desired microbend may be envisioned, the arrangement depicted in FIG. 2 using two movable chucks which contain stationary fiber fixtures is advantageous. FIG. 2 shows the fiber fixtures labeled A and two chucks labeled B. The fixtures A are provided with feeder fiber-receiving v-grooves. The separation of the two chucks labeled B and the chuck bend angle, denoted angle θ in FIG. 2 are two fabrication parameters which together influence the resulting bend stress on the feeder fiber 10.

As seen in FIG. 2, the chucks B are pivoted from their original position in which the feeder fiber is straight, to a position which places the respective v-groove of the chucks at an angle to each other. The feeder fiber 10 is inserted into the chucks A, A while the latter are in their aligned position of FIG. 2 in which θ=0. With equal pivoting of the two chucks in opposite directions, the feeder fiber is given an initial radius of curvature, denoted "r" in FIG. 2. Radius "r" advantageously is in the range of approximately 0.1 inches to 0.5 inches after heating.

HEAT SOURCE

In general, use of wider heat sources capable of applying heat uniformly over the segment of fiber to be bent, are preferable to point sources such as a flame. Use of a $CO_2$ laser with a laser spot size (3 mm) or of an elongated temperature filament achieve larger bend angles and higher collection efficiencies.

Figure 3:
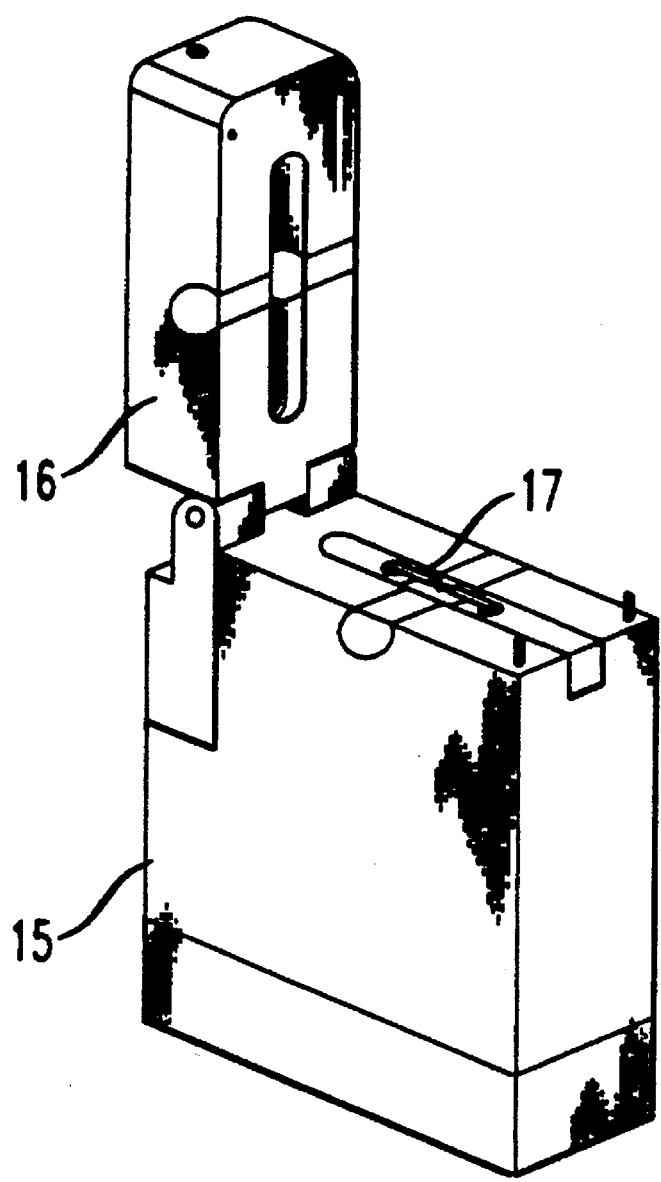
FIG. 3 is a diagram of a heat source.

An example of a tungsten filament heat source used in the illustrative embodiment is shown in FIG. 3 which shows a stand 15 with a pivotable cover 16. The filament source denoted 17 is positioned within the structure to be finely located with respect to the feeder fiber 10. The structure shown permits a degree of control over fiber displacement.

Controllability of the heat source is critical to maintaining the repeatability of the coupling results. The onset of creep in glass fibers has been determined to be extremely sensitive to fiber temperature. "Creep" is the propensity of the fiber to deform or relax under stress, a property which must be controlled in the instant process in order to induce a permanent bend.

The tungsten filament heat source of FIG. 3 may also require a filament power supply potentiometer (not shown) and a supply of inert gas such as argon maintained at room temperature.

Figure 4:
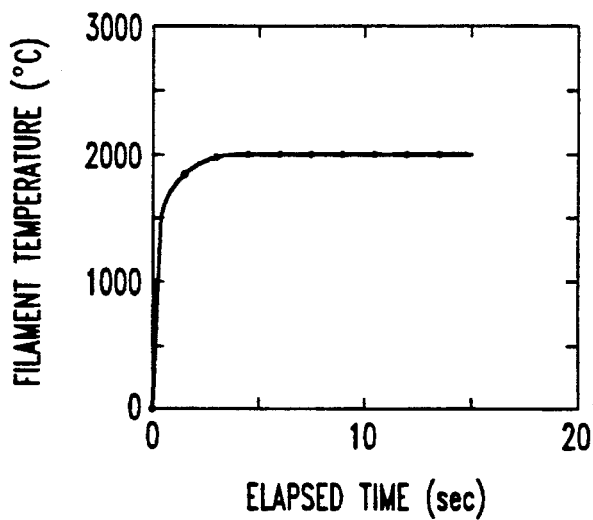
FIG. 4 is a graph of filament temperature versus time.

FIG. 4 shows the transient response of the filament temperature with elapsed time, using a 0.025 inch-wide tungsten filament. The response time is less than 500 ms. Response time in the range of ms is advantageous in practicing the invention, because short response times enable greater controllability of the process.

Figure 5:
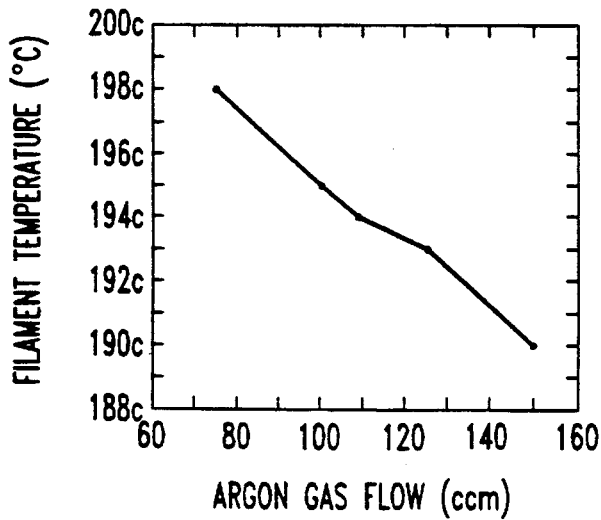
FIG. 5 is a graph of gas flow rate versus filament temperature.

The effect of argon gas flow on filament temperature is depicted in FIG. 5. For gas flow rates in the range of 75 ccm to 150 ccm the effect on filament temperatures is roughly linear, a decided advantage in achieving a very fine control (+−1° C.) over desired temperature of the bend zone of the fiber, given a constant potentiometer setting.

Figure 6:
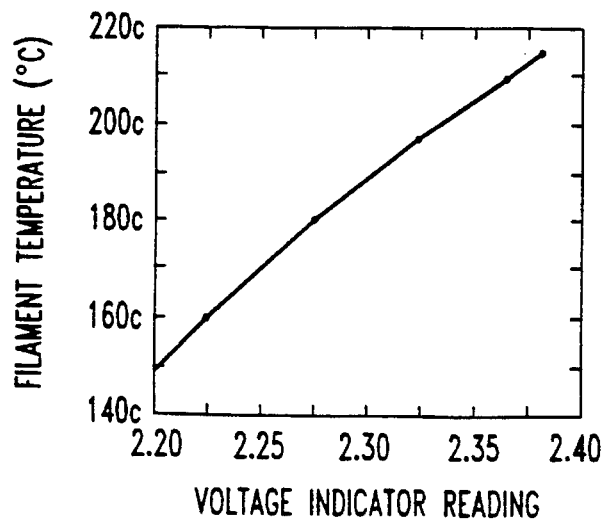
FIG. 6 is a graph of filament temperature versus voltage.

The waveshape of the signal which energizes the heating filament may be controlled by adjusting the potentiometer. A duty cycle comprising a pulsed, constant voltage triangular waveshape may be employed, for example. An illustration of the measured effect of filament power supply adjustments and the filament temperature is provided in FIG. 6. In general, the effect upon filament temperature of the setting of the potentiometer is substantially linear over temperatures of interest.

In addition to tungsten element heat sources, platinum and iridium elements may be used. Also, $CO_2$ laser, electric arc, and flame may be used as a heat source.

COLLECTION OPTICS

The positioning of the branch fiber end with respect to the microbend may be adjusted in accordance with another aspect of the invention, to achieve peak collection efficiency. Alteratively, a fiber-receiving substrate with pre-determined fiber groove configurations and optimum intersection angles may be utilized by experimentation with different optical fibers, which will achieve peak or near-peak collection efficiency in field applications of the coupler.

Figure 7:
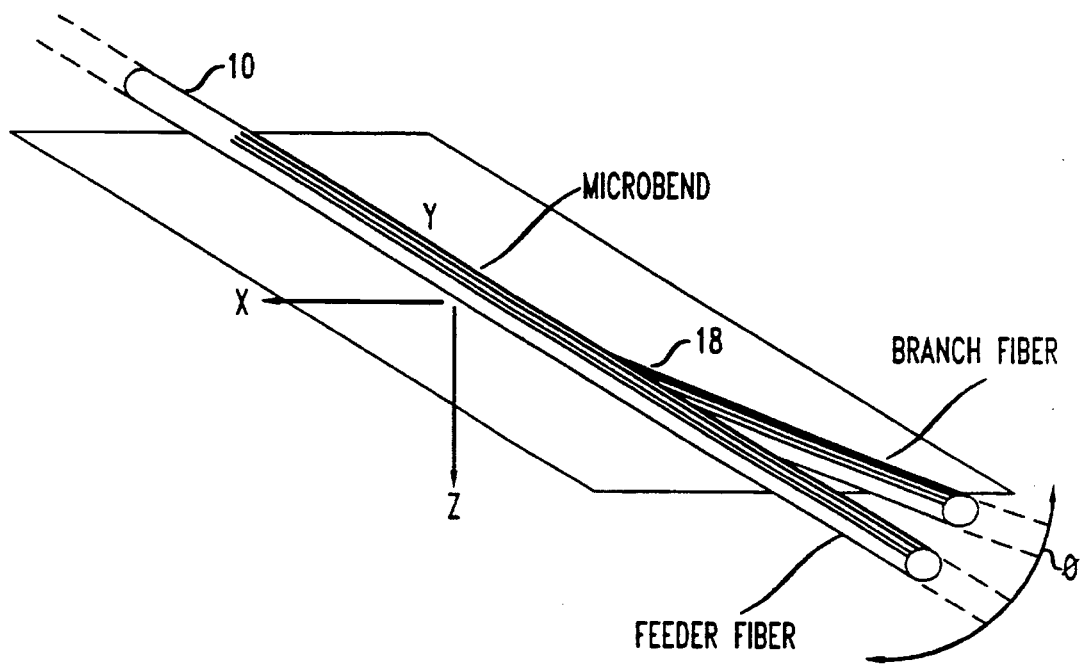
FIG. 7 is a sketch of a fiber coupler substrate.

FIG. 7 shows schematically the alignment of the feeder fiber 10 having an established microbend, with the end 18 of a branch 12, in x-y-z space, where the x-y plane is that of a fiber-receiving substrate, for example. The branch fiber 12 is shown in an optimal relationship, where its elongate core axis is substantially in the x-y plane which contains the axis of the feeder fiber (i.e., the plane of the microbend). Slight variations in the Z- dimension of the branch fiber end with respect to the x-y plane containing the feeder fiber axis may be permitted, with some sacrifice of collection efficiency.

Collection efficiency is at a maximum when the feeder fiber and the branch fiber lie in the same plane. In the x-z plane containing the areas of both fibers depicted in FIG. 7, several adjustments are possible. The first is placement of the end 18 of branch fiber 12 at a pre-determined distance from the microbend.

The second adjustment is positioning of the core axis of branch fiber 12 with respect to the continuation of the core axis of feeder fiber 10. This is indicated by the x-direction of FIG. 7.

The third adjustment is the angle, denoted φ in FIG. 7, which the axis of branch fiber 12 makes the axis of the feeder fiber 10 as it continues following the microbend. The angle φ is typically equal to the angle of the microbend. However, variations of φ have relatively little effect on the collection efficiency.

The collection efficiency into the branch fiber may be increased by bending the target fiber elastically after the microbend fabrication. This idea allows the collection fiber to move closer to the bend site.

In accordance with another aspect of the invention, significant improvements in collection efficiency are achieved by using a branch fiber with a large core diameter than that of the feeder fiber. However, unless the branch route is relatively short, the larger core diameter branch fiber may cause an adverse impact on the transmission of higher bit rate signals due to dispersion effects.

FIBER V-GROOVE SUBSTRATE

A fiber v-groove fixture denoted 20 for receiving the uncoated microbender feeder fiber and branch fiber to be coupled thereto, is shown in FIG. 8. Two locator marks are provided along the v-grooves: one to locate the end branch fiber 12 in its receiving groove 21; and the second to locate the center of the feeder fiber microbend in its receiving v-groove 22. With the two fibers so positioned, encapsulant is applied to fix the fiber in position. Note that the branch fiber may be positioned in the v-groove prior to this step.

ENCAPSULANTS

Encapsulants may be used to cover the microbend site with a protective layer, which also maintain proper alignment of the feeder and branch fibers. The encapsulant should have an appropriate refractive index to allow light to escape to the fiber cladding and to ensure low-loss transmission. Viscosity and shrinkage should be low; while final cure hardness should be high. A suitable encapsulant is: LCR000/1.46+UV, obtainable from ICI Resins US.

FIELD USE

Figure 9:
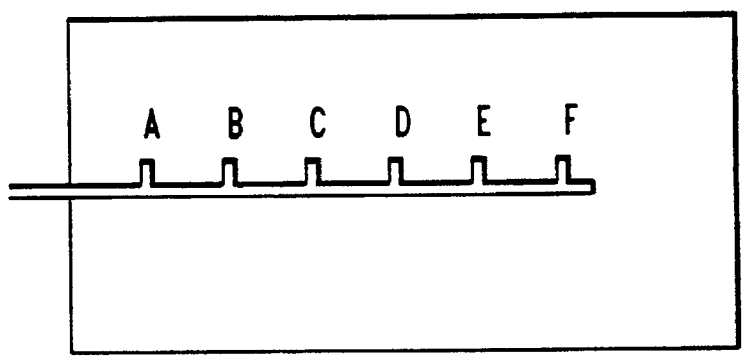
FIGS. 9–11 are schematic diagrams of the field use of the coupler.
Figure 10:
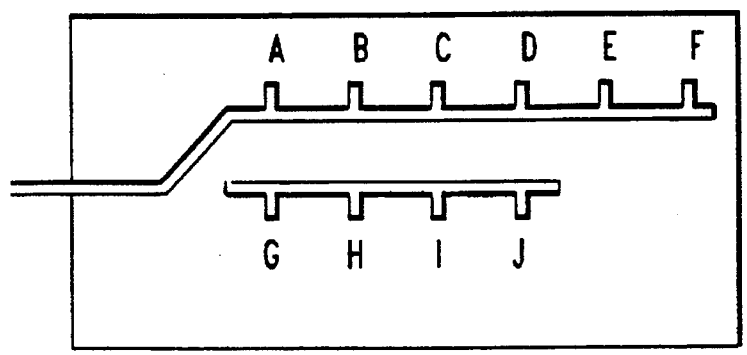
Figure 11:
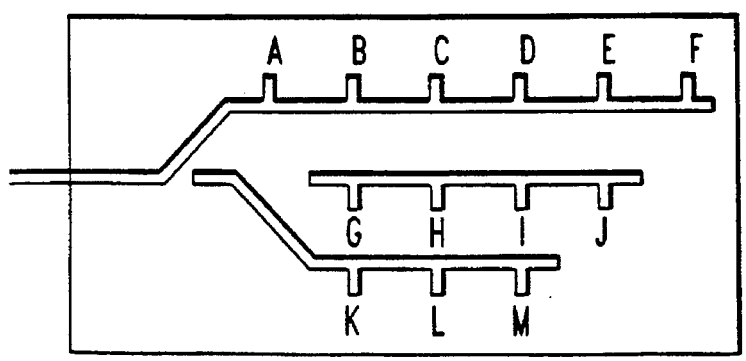

The field use of couplers made according to the present invention is depicted in FIGS. 9, 10 and 11. An existing installation of an optical fiber LAN in a building, seen in FIG. 9, and including stations A, B, C, D, E, F may be augmented by adding a branch with telecommunication stations G, H, I, J to the existing feeder as seen in FIG. 10.

The concept can be extended as seen in FIG. 11, by interposing a second optical coupler branch which serves further stations K, L, M. Many additional variations may be envisioned.

We claim:

1. A process for coupling a first coated optical fiber to a second coated optical fiber, comprising the steps of:

Removing the coating from a small length of said first fiber, leading to an exposed fiber portion;

Bending the first fiber so as to produce, within the exposed fiber portion, a bend zone having a radius of curvature in the range of 0.1 to 0.5 inches and a bend angle in the range of 10° to 40°, the bending step carded out so as to produce an uncompensated tensile stress within the bend zone;

Heating said bend zone sufficiently to relax mechanical internal stresses created by said bending and thereafter cooling said bend zone; and Without repeating the bending and heating steps, placing an end portion of said second optical fiber in close proximity of said bend zone, with the optical axes of said first and second fibers being disposed in a common plane.

2. The process of claim 1, wherein said heating step is accomplished by a filament element selected from the group consisting of tungsten, platinum and iridium.

3. The process of claim 2, comprising the further step of applying a controlled flow of an inert gas onto said filament element to finely control the temperature of said bend zone during heat application.

4. The process of claim 1, wherein said heating step is accomplished by a $CO_2$ laser with a spot size of approximately 3 mm.

5. The process of claim 1, comprising the further step of containing said first and said second fibers in a V-groove substrate in their said coupled configuration.

6. The process of claim 1, wherein the heating step further comprises heating the bend zone to an annealing temperature, and over at least 34% of the bend zone, controlling the annealing temperature to within 1° C.

* * * * *